United States Patent
Iftime et al.

(10) Patent No.: US 7,556,844 B2
(45) Date of Patent: *Jul. 7, 2009

(54) RADIATION CURABLE PHOTOCHROMIC INKS

(75) Inventors: Gabriel Iftime, Mississauga (CA); Christopher A Wagner, Etobicoke (CA); Eniko Toma, Mississauga (CA); Jennifer L Belelie, Oakville (CA); Peter G Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 511 days.

This patent is subject to a terminal disclaimer.

(21) Appl. No.: 11/276,678

(22) Filed: Mar. 9, 2006

(65) Prior Publication Data

US 2007/0211110 A1    Sep. 13, 2007

(51) Int. Cl.
C08J 7/04 (2006.01)
C08J 7/18 (2006.01)
C09D 11/10 (2006.01)

(52) U.S. Cl. .............. 427/510; 427/511; 427/514; 522/75; 522/8; 522/18; 522/96; 522/170; 522/173; 522/182

(58) Field of Classification Search .......... 522/75, 522/74, 80, 170, 181, 182, 168, 8, 18, 173; 427/510, 511, 514
See application file for complete search history.

(56) References Cited

U.S. PATENT DOCUMENTS

| | | | |
|---|---|---|---|
| 4,927,180 A | 5/1990 | Trundle et al. | |
| 5,175,079 A * | 12/1992 | Van et al. | 430/338 |
| 5,551,973 A * | 9/1996 | Oliver et al. | 106/31.25 |
| 5,593,486 A | 1/1997 | Oliver et al. | |
| 5,630,869 A * | 5/1997 | Amon et al. | 106/31.37 |
| 5,892,116 A | 4/1999 | Weiss et al. | |
| 6,245,711 B1 * | 6/2001 | Halbrook, Jr. | 503/206 |
| 6,329,453 B1 | 12/2001 | Meinhardt et al. | |
| 6,536,889 B1 | 3/2003 | Biegelsen et al. | |
| 6,561,640 B1 | 5/2003 | Young | |
| 6,872,243 B2 * | 3/2005 | Breton et al. | 106/31.29 |
| 7,153,349 B2 * | 12/2006 | Carlini et al. | 106/31.29 |
| 7,173,071 B2 * | 2/2007 | Suhadolnik et al. | 522/18 |
| 7,317,122 B2 * | 1/2008 | Carlini et al. | 560/115 |
| 2004/0065227 A1 | 4/2004 | Breton et al. | |
| 2006/0158491 A1 | 7/2006 | Belelie et al. | |
| 2006/0158492 A1 | 7/2006 | Odell et al. | |
| 2006/0158496 A1 | 7/2006 | Odell et al. | |
| 2006/0159850 A1 | 7/2006 | Breton et al. | |
| 2007/0120921 A1 | 5/2007 | Carlini et al. | |
| 2007/0120924 A1 | 5/2007 | Odell et al. | |

FOREIGN PATENT DOCUMENTS

WO    WO 97/24364    7/1997

* cited by examiner

*Primary Examiner*—Susan W Berman
(74) *Attorney, Agent, or Firm*—Oliff & Berridge, PLC

(57) ABSTRACT

An ink that may be used in ink jet devices is a photochromic ink comprising an ink vehicle that includes at least one radiation curable component, at least one photochromic material and at least one photoinitiator. The ink is cured via exposure to radiation that cures the at least one radiation curable component of the ink. A radiation curable ink capable of exhibiting photochromatic color changes, which may be used to indicate a document's authenticity, is thus achieved.

24 Claims, No Drawings

RADIATION CURABLE PHOTOCHROMIC INKS

BACKGROUND

Described herein are radiation curable photochromic ink compositions ideally suited for use in ink jet ink printing devices. In embodiments, the photochromic ink includes a radiation curable ink vehicle, a photochromic material and an optional colorant. The ink vehicle may also contain one or more gelators and/or additional radiation curable components, along with an initiator for curing.

The volume of digital color printing is expected to experience significant growth in the coming years. The color images provided by ink jet printing inks are overwhelmingly preferred in panel studies over other digital imaging systems. There is also a strong case to be made that the total cost of ownership of an ink jet printer will ultimately be cheaper than similar volume electrophotography units.

Ink jetting devices are known in the art, and thus extensive description of such devices is not required herein. As described in U.S. Pat. No. 6,547,380, incorporated herein by reference, ink jet printing systems are generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to six rotations (incremental movements) of a substrate (an image receiving member or intermediate transfer member) with respect to the ink jetting head, that is, there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Conventional phase change hot melt inks typically used with ink jet printers of the aforementioned type frequently utilize a wax based ink vehicle, for example, a crystalline wax. Use of such crystalline waxes requires that the printhead be kept at least at 135° C. throughout printing with the device. The wax based inks are heated to such high temperatures to decrease their viscosity for proper jetting. Moreover, if the printhead is cooled and re-warmed, a lengthy purge cycle that consumes significant amounts of ink must be carried out. The brittle crystalline waxes also do not provide robust images and are easily scratched. This is because wax based inks generally crystallize at temperatures greater than room temperature and therefore, the wax based ink that has been transferred to the recording medium is essentially as hard as it will get. The high energy consumption, waste of expensive ink during purging, and fragile images all cause customer dissatisfaction, and in some markets prevent any sales penetration at all.

Recently, Xerox has discovered several radiation curable inks that may be jetted at much lower temperatures and that achieve robust images following curing. Reference is made to the following patent properties, each of which is incorporated herein by reference in its entirety. (1) Co-pending application Ser. No. 11/034,850 filed Jan. 14, 2005; (2) Co-pending application Ser. No. 11/034,856 filed Jan. 14, 2005; (3) Co-pending application Ser. No. 11/034,714 filed Jan. 14, 2005; (4) Co-pending application Ser. No. 11/034,866 filed Jan. 14, 2005; (5) Co-pending application Ser. No. 11/289,609 filed Nov. 30, 2005; and (6) Co-pending application Ser. No. 11/289,473 filed Nov. 30, 2005. U.S. Pat. Nos. 6,561,640 and 6,536,889, each incorporated herein by reference in its entirety, describe processes of forming ink jetted images using UV curable inks.

U.S. Pat. No. 5,892,116 (Weiss et al.) and PCT Patent Publication WO 97/24364 (Weiss et al.), the disclosures of each of which are totally incorporated herein by reference, disclose gelators that gel a variety of nonpolar and polar liquids. Moreover, gelation of various monomers with subsequent polymerization of the gelled monomers forms organic zeolites and membrane materials.

U.S. Pat. No. 5,593,486, incorporated herein by reference in its entirety, describes a hot melt ink composition comprising (a) an ink vehicle that is solid at about 25° C. and having a viscosity of from about 1 to about 20 centipoise at a temperature suitable for hot melt ink jet printing, the temperature being greater than about 45° C., (b) a photochromic material, (c) an optional colorant, and (d) an optional propellant U.S. Pat. No. 6,329,453, incorporated herein by reference in its entirety, describes a photochromic phase change ink composition that contains (A) at least one selected polymeric and photochromic yellow phase change colorant and (B) a phase change ink carrier composition comprising (1) a resin selected from the group consisting of a urethane resin, a mixed urethane/urea resin and mixtures thereof; and (2) a mono-amide.

It is desirable in many commercial fields to provide validation or security markings to products or documents in order to make forgery or counterfeiting more difficult. U.S. Pat. No. 4,927,180, incorporated herein by reference in its entirety, describes a method of marking an article or substrate with a mark or device that is made visible or is enhanced on exposure to UV light, comprising printing onto the article or substrate a photochromic ink containing a photochromic compound that is reversibly converted to a colored form on exposure to UV light and reverts to a substantially colorless form in the absence of UV light, and applying a superficial protective layer to the mark or device to protect the photochromic compound against degradation by atmospheric moisture and oxygen.

While known compositions and processes are suitable for their intended purposes, a need remains for improvements in radiation curable inks, for example with respect to developing a radiation curable ink with photochromic capabilities.

SUMMARY

These and other improvements are accomplished by the photochromic inks described herein, and processes of forming images with such photochromic inks.

In embodiments, described is an ink that may be used in ink jet devices is a photochromic ink comprising an ink vehicle that includes at least one radiation curable component, at least one photochromic material and at least one photoinitiator. The ink is cured via exposure to radiation that cures the at least one radiation curable component of the ink. A radiation curable ink capable of exhibiting photochromatic color changes, which may be used to indicate a document's authenticity, is thus achieved.

Thus, described is a photochromic ink comprising an ink vehicle that includes at least one radiation curable component, at least one photochromic material and at least one photoinitiator.

In embodiments, also described is an image forming process, comprising providing a photochromic ink comprising an ink vehicle that includes at least one radiation curable component, at least one photochromic material and at least one photoinitiator, forming an image on an image receiving substrate with the photochromic ink, and curing the photochromic ink by exposure to radiation for curing the at least one radiation curable component.

In embodiments, also described is a process for authenticating a document, comprising forming an image on the document with a photochromic ink comprising an ink vehicle that includes at least one radiation curable component, at least one photochromic material and at least one photoinitiator, curing the photochromic ink by exposure to radiation for curing the at least one radiation curable component, which curing effects a color change in the at least one photochromic material, and subsequently exposing the cured ink to visible light to render the photochromic material substantially colorless, and exposing the document to activating radiation to generate a color change in the photochromic ink, the color change indicating the authenticity of the document.

EMBODIMENTS

Curable herein refers to, for example, a material that may be cured via polymerization routes, including for example cationic routes and free radical routes. Radiation curable as used herein refers to, for example, the ability of a material of the ink to cure upon exposure to curing radiation such as ultraviolet (UV) radiation.

Photochromic as used herein refers to, for example, a material that undergoes a reversible change from a first color state to a second color state, for example from a substantially colorless state to a colored state, upon exposure to radiation of an appropriate wavelength. The photochromic effect (photochromism) in general is thus a reversible change of a chemical species between two states having distinguishably different absorption spectra (color), wherein the change is induced in at least one direction by the action of activating radiation. The chemical species exhibiting photochromism may be a molecule or an ion, and the reversible change in states may be a conversion between two molecules or ions, or the dissociation of a single molecule or ion into two or more species, with the reverse change being a recombination of the two or more species thus formed into the original molecule or ion.

Color refers to, for example, the overall absorption characteristic within the same range of wavelengths of the electromagnetic spectrum. Thus, differently colored inks exhibit a color, that is, an absorption characteristic, different from each other. For example, if a first ink exhibits a yellow color, then a second differently colored ink must exhibit a different shade of yellow or a different color altogether, for example such as cyan or magenta.

In a first embodiment, the photochromic ink is comprised of at least one radiation curable component, at least one photochromic material and at least one photoinitiator, and an optional colorant.

The photochromic inks may be liquid or solid at room temperature. It is desired for the radiation curable inks to have a viscosity of about 1 to about 20 centipoise (cps), for example from about 5 to about 15 or from about 8 to about 12, cps at the temperature of jetting. The inks may be jetted at temperatures of from about 50° C. to about 150° C., for example from about 60° C. to about 120° C. or from about 70° C. to about 110° C.

As the radiation curable component of the photochromic ink, any suitable curable material, for example including monomers, oligomers and/or lower molecular weight (for example, weight average molecular weights of about 5,000 or less, such as about 200 to about 5,000) polymers, may be used.

The radiation curable component may particularly comprise a material including one or more unsaturated functional groups therein. For example, materials that are radiation curable, for example by cationic curing routes, may include, for example, cycloaliphatic epoxide, and preferably one or more polyfunctional cycloaliphatic epoxides. The epoxy groups may be internal or terminal epoxy groups such as those described in WO 02/06371, incorporated herein by reference. Multifunctional vinyl ethers can also be used. Additional example curable monomers/oligomers include the following:

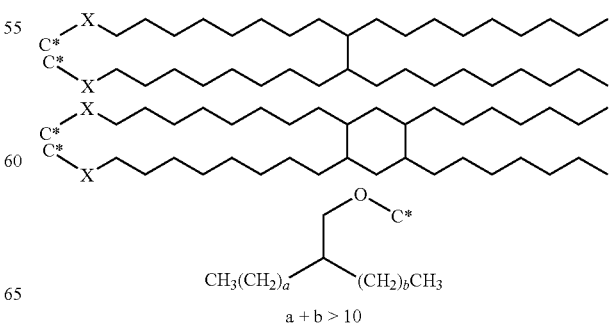

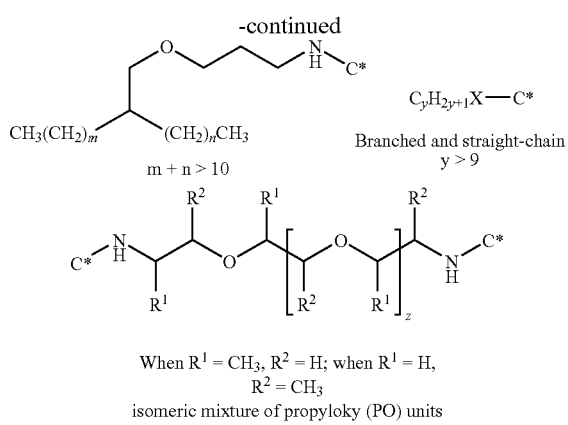

In the foregoing, X may be O or NH, and C* may be any of

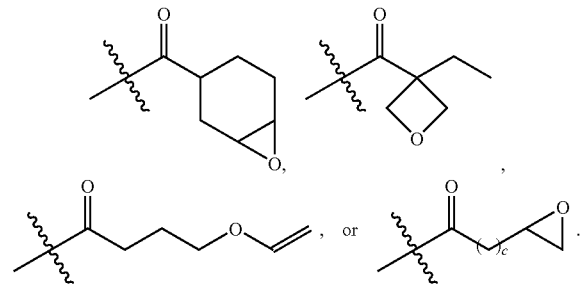

Additional curable materials, for example that may be cured by radical polymerization routes, may include, for example, acrylate and methacrylate monomers. As examples, isobornyl (meth)acrylate, lauryl (meth)acrylate, isodecyl (meth)acrylate, isooctyl (meth)acrylate and butyl acrylate may be used. In addition, multifunctional acrylate monomers/ oligomers may be used not only as radiation curable components of the ink vehicle, but also as materials that can increase the crosslink density of the cured image, thereby enhancing the images toughness. As multifunctional acrylates and methacrylates, pentaerytritol tetra(meth)acrylate, 1,2-ethylene glycol di(meth)acrylate, 1,6-hexanediol di(meth)acrylate, butanediol diacrylates, 1,12-dodecanol di(meth)acrylate, neopentyl glycol diacrylates such as propoxylated neopentyl glycol diacrylate (available from Sartomer as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation)), trimethylolpropane triacrylate, glyceryl triacrylate, glycerol propoxylate triacrylate, dipentaerythritol penta-/hexa-acrylate, ethoxylated pentaerythritol tetraacrylate (available from Sartomer as SR 494), mixtures thereof and the like may be used.

The radiation curable component may be included in the photochromic ink in amounts of from, for example, about 5% to about 95% by weight, for example from about 20% to about 90% by weight or from about 40% to about 90% by weight of the photochromic ink.

In embodiments, the photochromic ink and/or radiation curable component thereof may also include at least one gelator material therein. The gelator may be organic, and may particularly be nonpolymeric, for example monomeric or oligomeric. The gelator functions to dramatically increase the viscosity of the ink within a desired temperature range. In particular, the gelator forms a solid-like gel in the ink vehicle at temperatures below the temperature at which the ink is jetted. The gel phase typically comprises a solid-like phase and a liquid phase in coexistence, wherein the solid-like phase forms a three-dimensional network structure throughout the liquid phase and prevents the liquid phase from flowing at a macroscopic level. The inks exhibit a thermally reversible transition between the gel state and the liquid state when the temperature is varied above or below the gel point of the ink. This cycle of gel reformation can be repeated a number of times, since the gel is formed by physical, non-covalent interactions between the gelator molecules, for example interactions such as hydrogen bonding, aromatic interactions, ionic bonding, coordination bonding, London dispersion interactions, or the like.

A gelator may be used to affect a rapid viscosity increase in the jetted ink upon the substrate. In particular, jetted ink droplets would be pinned into position on a receiving substrate such as an image receiving medium, for example paper or a transparency, or an intermediate transfer member, for example a transfuse drum or belt, that is at a temperature cooler than the ink jetting temperature of the ink through the action of a phase change transition in which the ink undergoes a significant viscosity change from a liquid state to a gel state (or semi-solid state). The gelled ink is effectively a physical gel, and also a thermally reversible and elastic aggregate or networked assembly of chemical components, held together by non-covalent bonds such as hydrogen bonding and Van der Waals hydrophobic forces.

The temperature at which the ink forms the gel state is as a result of the presence of a gelator may be, for example, from about 30° C. to about 100° C., such as from about 30° C. to about 80° C. or from about 30° C. to about 60° C. In cooling from the jetting temperature liquid state to the gel state, the ink undergoes a significant viscosity change. The viscosity increase may be, for example, at least about a $10^{2.5}$ fold increase in viscosity.

When the inks are in the gel state, the viscosity of the ink is at least about 1,000 cps, for example at least about 10,000 cps or at least about 100,000 cps. Thus, viscosity values in the gel state may be in the range of from about 1,000 to about $10^9$ cps such as from about $10^{2.5}$ to about $10^9$ cps or from about $10^{5.5}$ to about $10^{8.5}$ cps, although the viscosity can also be outside of these ranges.

As the at least one gelator, any gelator known in the art may be used herein. Specific examples include polymerizable epoxy-containing or amine-containing gelators. Moreover, co-pending U.S. patent application Ser. No. 11/034,866, co-pending application Ser. No. 11/289,609 and co-pending application Ser. No. 11/289,473, each incorporated by reference herein in its entirety, also disclose suitable gelator materials. As specific examples of gelator materials, the gelator may be a gelator with amphiphilic properties such as functional N-acyl-1,ω-amino acid derivatives, di-functional (1R, 2R)-trans-1,2-bis(ureido) cyclohexane derivatives, and/or difunctional ortho bis(ureido) benzene derivatives. The functional N-acyl-1,ω-amino acid derivatives may be any of those described by Mieden-Gundert in *Angew. Chem. Int. Ed.* 2001, 40, No. 17, p. 3164-3165. The di-functional (1R,2R)-trans-1, 2-bis(ureido) cyclohexane derivatives may be any of those described by De Loos et al. in a paper entitled "Remarkable Stabilization of Self-Assembled Organogels by Polymerization" in J. Am. Chem. Soc. 1997, 119, 12675-12676.

The gelators may be included in the ink in a concentration range of about $10^{-4}$ to about $10^{-1}$ moles/liter, for example from about $5\times10^{-4}$ to about $10^{-2}$ moles/liter. The gelators thus may comprise from about 1% to about 50% by weight of the ink, for example from about 1% to about 20% by weight or from about 2% to about 15% by weight of the ink. Increasing the amount of gelator in the ink typically increases the temperature at which the transition from gel state to liquid state occurs. Accordingly, it is possible to adjust physical characteristics of the ink such as the gel-liquid transition temperature by adjusting the amount of gelator. It is also possible to adjust the transition from gel to liquid by selecting different conditions for the imaging process, such as shear, stress, and rate of heating or cooling.

Additional examples of organic gelators include, for example:

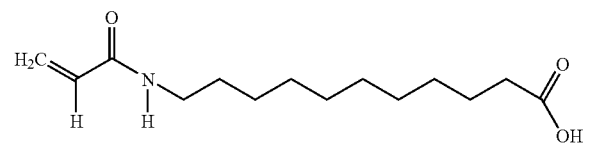

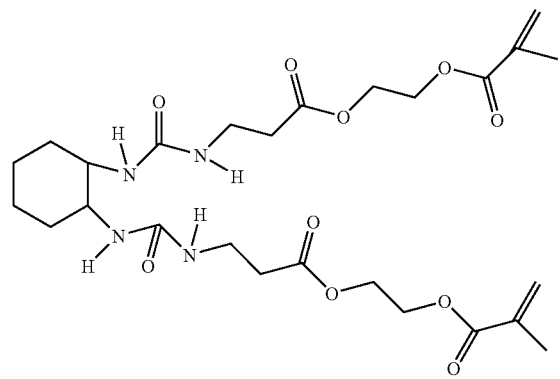

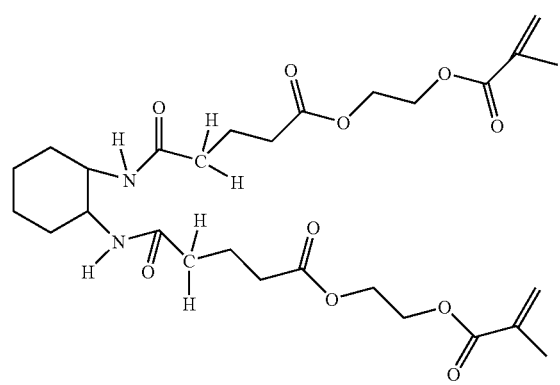

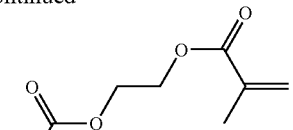

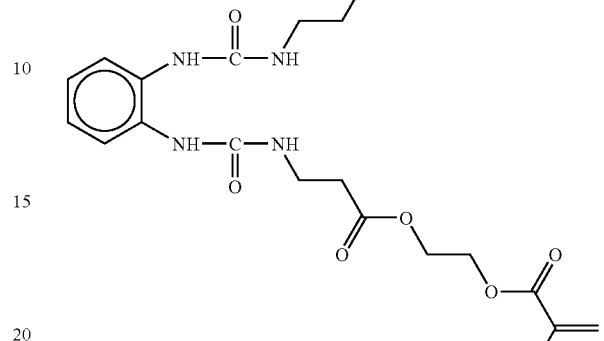

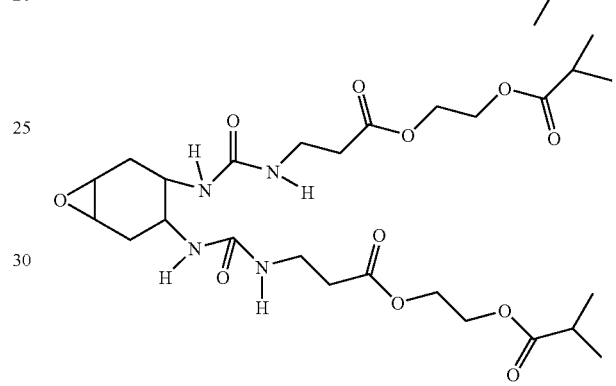

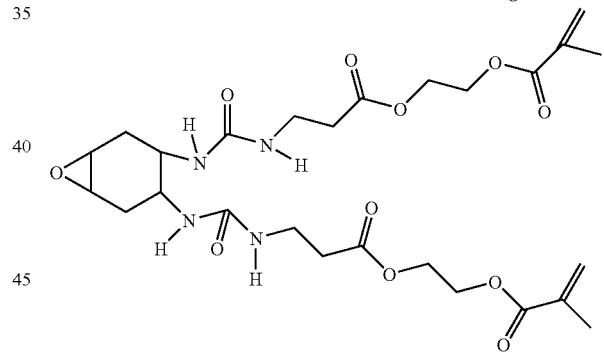

those disclosed at SAFIN 2001, Euroconference on Self-Assembled Fibrillar Networks held in Autrans, France on Nov. 24-28, 2001, U. Beginn et al.:

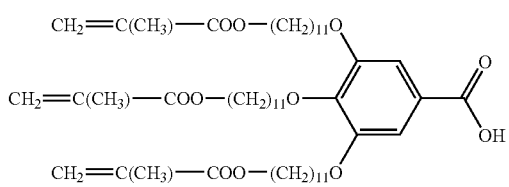

-continued

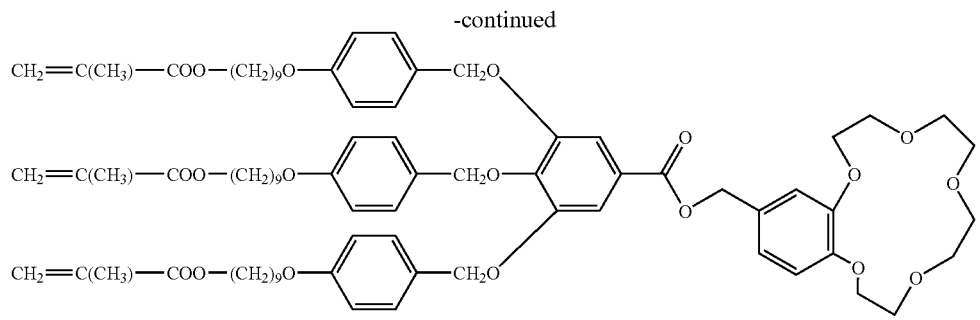

and from Berthier D. et al.:

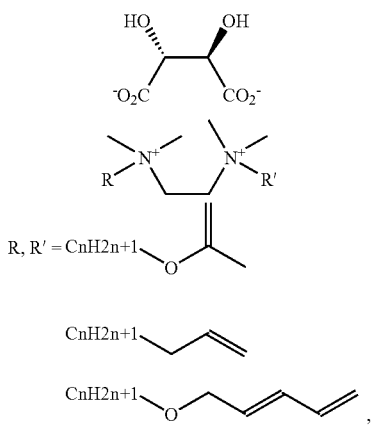

and those set forth in U.S. Patent Publication 2004-0065227 A1, incorporated herein by reference in its entirety. Any of the gelators described in this Publication may be used in the inks herein, and may further be used as modified to include a curable or polymerizable group, such as a group that allows the gelator to become curable and participate in the network formed upon radiation curing of the ink. In this regard, if the organic gelator is to be cationically curable, the organic gelator may be modified to include cationically curable groups such as epoxy, vinyl ether, or styrene groups and the like. If the organic gelator is to be radically curable, the gelator may be modified to include an acrylate group, meth(acrylate) group, allyl ether group and the like. The modification of the gelators described in U.S. Patent Publication 2004-0065227 A1 to include such reactive groups may be done by any suitable technique, example techniques of which are well understood by practitioners in the art and thus need not be detailed herein.

The total amount of gelator present in the ink may be from, for example, about 1% to about 50% by weight, for example from about 5% to about 40% by weight or from about 5% to about 30% by weight, of the photochromic ink.

An advantage associated with the use of gelator materials is that the ink may be made to not penetrate too far into an image receiving substrate such as paper. Excessive penetration into the substrate may result in the image of a colorless form of the ink being visible, for example as an outline, in the document. The formation of a gel using the gelator following printing of the ink can reduce penetration of the ink into the substrate, and thus reduce the formation of such ghost images, a desirable result when using the ink to embed authenticating information, for example information not intended to be seen in the document in visible light but which may be made to show up in verifying the authenticity of the document via exposure to UV light, in a document.

The photochromic ink also includes at least one photochromic material. The photochromic material may be present in the ink in any effective amount. For example, the photochromic material may be present in the ink in an amount of from about 1 to about 50% by weight, such as from about 1 to about 10% by weight or from about 3 to about 10% by weight, of the ink.

As the photochromic material, a material having high fatigue resistance may be used. This is specifically the case where the photochromic material exhibits photochromism at wavelengths of radiation that include the wavelengths of UV radiation used to cure the ink.

A photochromic material undergoes a reversible change in color upon exposure to activating radiation. For example, a substantially colorless form of a photochromic compound undergoes a transformation following exposure to activating radiation, for example UV light, to a different form of the compound that exhibits a visible color such as blue, red, yellow, and the like. Thus, in an ink, the colored form of the photochromic material following exposure to UV light will render a substantially colorless image visible in color, and in a colored ink, will alter the color exhibited by the colored ink containing the photochromic material. Upon exposure to visible light, for example sunlight or room light (incandescent light), the colored form of the photochromic material reverts to the substantially colorless form. Typically, the more intense the visible light, the more rapidly the reverse reaction to the substantially colorless form occurs.

Photochromic, or photochromic ink, thus refers to, for example, the capability of the photochromic material or ink to change color from a first color state to a second color state different from the first color state, after exposure to an activating radiation, for example a radiation source having a wavelength from about 100 nm to about 1100 nm. The activating radiation may thus be in the ultraviolet (UV), visible or infrared regions, although the use of activating radiation in the UV region (from about 100 nm to about 400 nm) is most common. The change of color, or absorption behavior, may occur instantaneously on exposure to the activating radiation, or may occur after overcoming any activation phase. The color change exhibited by the photochromic ink is ideally reversible, but should last for a time period permitting the color change to be detected, for example a time frame of from about 0.5 second to about 1 hour or more. Reversibility, or color cancellation, of the color change may be accelerated, for example by heating, by exposure to a distinct wavelength radiation different from that of the first coloration (for example sun light radiation or other visible light such as room light), and the like.

It is desirable for the photochromic material to be able to undergo the coloration/decoloration cycle a large number of times so that the photochromic capabilities of a document printed with the photochromic ink are not quickly lost. However, because the coloration/decoloration cycle in most photochromic materials involves a chemical conversion or reaction, degradation, for example through the action of undesired side reactions, may occur over time. The higher the number of coloration/decoloration cycles that a photochromic material may undergo, the higher is the material's fatigue resistance.

The photochromic inks described herein are typically curable upon exposure to UV light. The length of exposure time in curing the ink may be significantly longer than the time usually required for a color change to be effected in a photochromic material. The exposure to radiation in curing the ink thus may significantly degrade a photochromic material in the ink that undergoes a color change at the radiation wavelengths used for curing. Thus, for inks containing photochromic materials that undergo a color change upon exposure to radiation having a wavelength the same as that used in curing the ink, it is necessary for the photochromic material to have high fatigue resistance. High fatigue resistance photochromic compounds refer in embodiments to photochromic compounds that will still perform a number of coloration/decoloration cycles following curing of the photochromic ink by exposure to curing radiation. For example, the photochromic material undergoes from about 10 to about 10,000,000, for example from about 10 to about 1,000,000 or from about 20 to about 500,000, coloration/decoloration cycles. A low fatigue resistance compound shows no photochromic activity after exposure to the curing radiation. Examples of low fatigue resistance compounds are, for example, some spiropyrans like 1',3'-dihydro-1',3',3'-trimethyl-6-nitrospiro-[2H-1-benzopyran-2,2'-(2H)-indole] that is completely degraded by exposure to the curing radiation. Other spiropyran compounds, however, may possess sufficient fatigue resistance so that they are still photochromically active after curing.

Any photochromic compound that has sufficient fatigue resistance so that it shows photochromic activity after photocuring is thus suitable for use in the inks described herein. The photochromic material may be a small molecule, or it may optionally be incorporated into a polymeric structure, for example by attachment to/as a side chain, or by inclusion in the main chain of the polymer.

As an example photochromic material having high fatigue resistance, diarylethene compounds may be used, for example having a formula and undergoing a reversible color change reaction as follows:

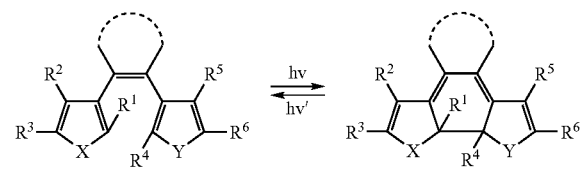

In the above formula, X and Y may be, individually, sulfur, nitrogen, hydrogen, oxygen and the like, and specifically may be sulfur and/or nitrogen. $R^1$ and $R^4$ may be, individually, an alkyl, alkoxy or aryl group, for example having from 1 to about 30 carbon atoms, such as from about 1 to about 25 or from about 1 to about 10 carbon atoms. $R^1$ and $R^4$ may specifically be an alkyl having from 1 to about 20 carbon atoms, for example from about 1 to about 15 or from about 1 to about 10 carbon atoms, and may be methyl, ethyl an the like. $R^2$, $R^3$, $R^5$ and $R^6$ may individually represent any substituted or unsubstituted substituent, for example each may be hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, and having from 1 to about 50 carbon atoms, such as from 1 to about 30 carbon atoms, aryl, such as having from about 5 to about 30 carbon atoms, for example from about 5 to about 20 carbon atoms, arylalkyl, such as having from about 6 to about 50 carbon atoms, for example from about 6 to about 30 carbon atoms, silyl groups, nitro groups, sulfo groups, cyano groups, halide atoms, such as fluoride, chloride, bromide, iodide, and astatide, amine groups, including primary, secondary, and tertiary amines, hydroxy groups, alkoxy groups, such as having from 1 to about 50 carbon atoms, for example from 1 to about 30 carbon atoms, aryloxy groups, such as having from about 5 to about 30 carbon atoms, for example from about 5 to about 20 carbon atoms, alkylthio groups or alkylsulfo groups, such as having from 1 to about 50 carbon atoms, for example from 1 to about 30 carbon atoms, arylthio groups or arylsulfo groups, such as having from about 5 to about 30 carbon atoms, for example from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, sulfo groups, cyano groups, halide atoms, such as fluoride, chloride, bromide, iodide, and astatide, amine groups, including primary, secondary, and tertiary amines, hydroxy groups, alkoxy groups, such as having from 1 to about 20 carbon atoms, for example from 1 to about 10 carbon atoms, aryloxy groups, such as having from about 5 to about 20 carbon atoms, for example from about 5 to about 10 carbon atoms, alkylthio groups or alkylsulfo groups, such as having from 1 to about 20 carbon atoms, for example from 1 to about 10 carbon atoms, arylthio groups or arylsulfo groups, such as having from about 5 to about 20 carbon atoms, for example from about 5 to about 10 carbon atoms, aldehyde groups, ketone groups, ester groups, amide groups, carboxylic acid groups, sulfonic acid groups, and the like. Further, two or more R groups can be joined together to form a ring, for example $R^2$ and $R^3$ and/or $R^5$ and $R^6$ may together form a substituted or unsubstituted phenyl ring.

Examples of suitable diarylethene compounds usable herein as photochromic materials include

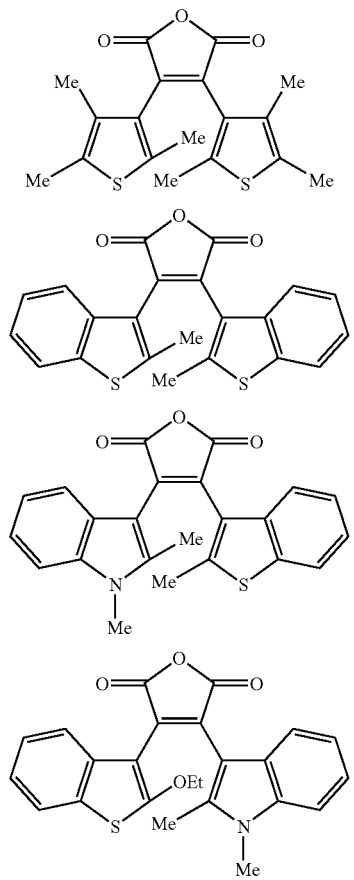
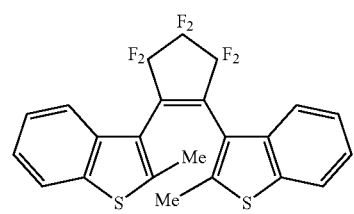
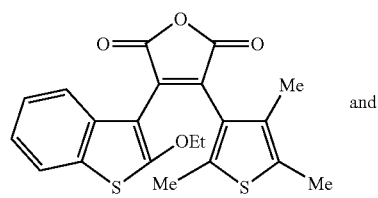
and
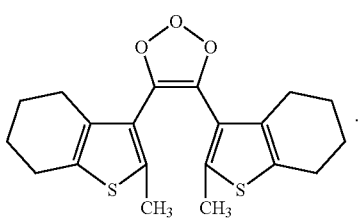

A specific diarylethene, and the reversible color change reaction of the diarylethene, is as follows:

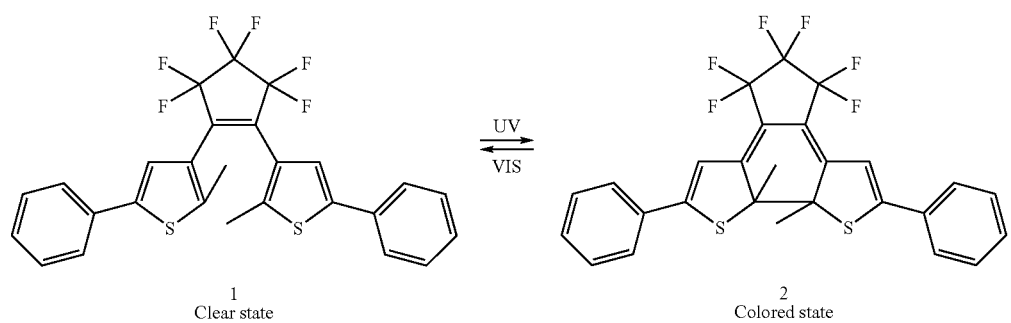

1
Clear state

2
Colored state

This compound switches between a colorless state, upon exposure to visible light such as sunlight or room light (incandescent light), and a dark blue state, upon exposure to UV light. The closed ring, or colored, form of this compound is, like other diarylethenes, thermally stable in the dark, which means that a printed document may retain the colored state for a very long period of time, for example for about 10 days to about 6 months or more, when protected from exposure to visible light.

Another class of suitable photochromic materials includes spiropyrans and analogue compounds of the general formulas:

-continued

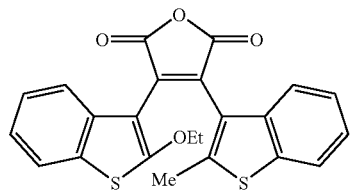

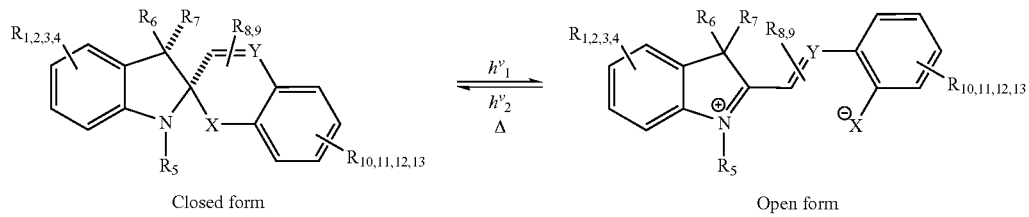

Closed form           Open form wherein $R_1$, $R_2$, $R_3$, $R_4$, $R_5$, $R_6$, $R_7$, $R_8$, $R_9$, $R_{10}$, $R_{11}$, $R_{12}$ and $R_{13}$ each, independently of the others, may be hydrogen, alkyl, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, for example with from 1 to about 50 carbon atoms, such as from 1 to about 30 carbon atoms, aryl, for example with from about 6 to about 30 carbon atoms such as from about 6 to about 20 carbon atoms, arylalkyl, for example with from about 7 to about 50 carbon atoms such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms such as from 1 to about 30 carbon atoms, aryloxy groups, for example with from about 6 to about 30 carbon atoms such as from about 6 to about 20 carbon atoms, alkylthio groups, for example with from 1 to about 50 carbon atoms such as from 1 to about 30 carbon atoms, arylthio groups, for example with from about 6 to about 30 carbon atoms such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 20 carbon atoms such as from 1 to about 10 carbon atoms, aryloxy groups, for example with from about 6 to about 20 carbon atoms such as from about 6 to about 10 carbon atoms, alkylthio groups, for example with from 1 to about 20 carbon atoms such as from 1 to about 10 carbon atoms, arylthio groups, for example with from about 6 to about 20 carbon atoms such as from about 6 to about 10 carbon atoms, aldehyde groups, ketone groups, ester groups, amide groups, carboxylic acid groups, sulfonic acid groups, and the like. Further, two or more R groups (that is, $R_1$ through $R_{13}$) can be joined together to form a ring. X may be oxygen atom (O) or sulphur atom (S). Y may be CH group, nitrogen atom (N) or phosphorus atom (P). Compounds with X=O and Y=CH are known as spiropyrans. In this case, the closed form isomer is known as a spiropyran compound, while the open form isomer is known as a merocyanine compound. Compounds with X=O and Y=N are known as spirooxazines. Compounds with X=S and Y=CH are known as spirothiopyrans.

Spirooxazines (X=O and Y=N), for example having a general formula:

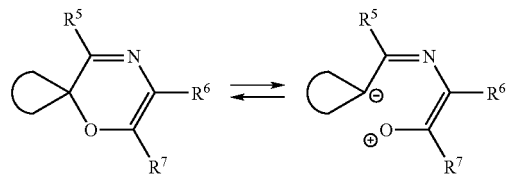

are known to have significantly higher fatigue resistance when compared with spiropyrans. In the above general formula, $R^5$, $R^6$, and $R^7$ each, independently of the others, can be hydrogen, alkyl, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, for example with from 1 to about 50 carbon atoms, such as from 1 to about 30 carbon atoms, aryl, for example with from about 6 to about 30 carbon atoms such as from about 6 to about 20 carbon atoms, arylalkyl, for example with from about 7 to about 50 carbon atoms such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms such as from 1 to about 30 carbon atoms, aryloxy groups, for example with from about 6 to about 30 carbon atoms such as from about 6 to about 20 carbon atoms, alkylthio groups, for example with from 1 to about 50 carbon atoms such as from 1 to about 30 carbon atoms, arylthio groups, for example with from about 6 to about 30 carbon atoms such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 20 carbon atoms such as from 1 to about 10 carbon atoms, aryloxy groups, for example with from about 6 to about 20 carbon atoms such as from about 6 to about 10 carbon atoms, alkylthio groups, for example with from 1 to about 20 carbon atoms such as from 1 to about 10 carbon atoms, arylthio groups, for example with from about 6 to about 20 carbon atoms such as from about 6 to about 10 carbon atoms, aldehyde groups, ketone groups, ester groups, amide groups, carboxylic acid groups, sulfonic acid groups, and the like. Further, two or more R groups can be joined together to form a ring.

Examples of spirooxazines include spiro[indoline-2,3'-[3H]-naphtho[2,1-b]-1,4-oxazines]:

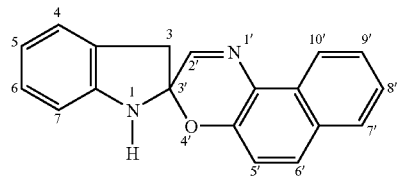

wherein substituents can be present on one or more of the 1, 3, 4, 5, 6, 7, 1', 2', 5', 6', 7', 8', 9', or 10' positions, spiro[2H-1,4-benzoxazine-2,2'-indolines], including those of the general formula:

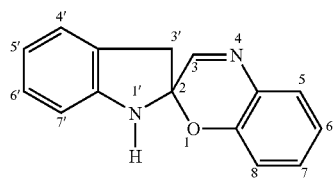

wherein substituents can be present on one or more of the 3, 5, 6, 7, 8, 1', 4', 5', 6', and 7' positions, and the like. Specific examples include 1,3-dihydro-1,3,3-trimethylspiro[2H-indole-2,3'-[3H]naphth[2,1-b]-[1,4]oxazine], 1,3-dihydro-1,3,3-trimethyl-5-nitrospiro[2H-indole-2,3'-[3H]naphth[2,1-b]-[1,4]oxazine], 1,3-dihydro-1,3,3-trimethyl-5,6'-dinitro-spiro[2H-indole-2,3'-[3H]naphth[2,1-b]-[1,4]oxazine], 1,3-dihydro-1,3,3-trimethyl-5-methoxy, 5'-methoxy-spiro[2H-indole-2,3'-[3H]naphth[2,1-b]-[1,4]oxazine], and 1,3-dihydro-1'-ethyl-3,3-dimethyl-5'-nitrospiro[2H-indole-2,3'-[3H]naphth[2,1-b]-[1,4]oxazine].

Another class of fatigue resistant photochromic materials are fulgides, of general formula:

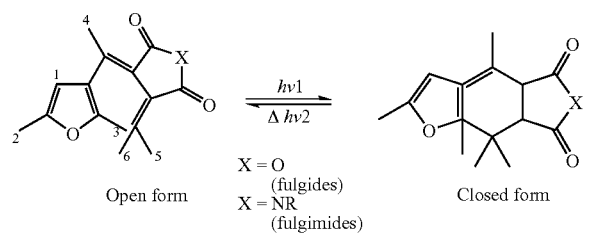

wherein one, two, three or more substituents may be optionally present at the 1, 2, 4, 5 and 6 positions. Examples of substituents and the R moiety include alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, for example with from 1 to about 50 carbon atoms, such as from 1 to about 30 carbon atoms, aryl, for example with from about 6 to about 30 carbon atoms such as from about 6 to about 20 carbon atoms, arylalkyl, for example with from about 7 to about 50 carbon atoms such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms such as from 1 to about 30 carbon atoms, aryloxy groups, for example with from about 6 to about 30 carbon atoms such as from about 6 to about 20 carbon atoms, alkylthio groups, for example with from 1 to about 50 carbon atoms such as from 1 to about 30 carbon atoms, arylthio groups, for example with from about 6 to about 30 carbon atoms such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 20 carbon atoms such as from 1 to about 10 carbon atoms, aryloxy groups, for example with from about 6 to about 20 carbon atoms such as from about 6 to about 10 carbon atoms, alkylthio groups, for example with from 1 to about 20 carbon atoms such as from 1 to about 10 carbon atoms, arylthio groups, for example with from about 6 to about 20 carbon atoms such as from about 6 to about 10 carbon atoms, aldehyde groups, ketone groups, ester groups, amide groups, carboxylic acid groups, sulfonic acid groups, and the like. Further, two or more substituents can be joined together to form a ring. In embodiments, the R moiety is hydrogen.

Specific examples of fulgides include 1-(p-methoxyphenyl)-ethylidene (isopropylidene) succinic anhydride; 2-[1-(2,5-dimethyl-3-furyl)-2-methylpropylidene]-3-isopropylidene succinic anhydride; and (1,2-dimethyl-4-isopropyl-5-phenyl)-3-pyrryl ethylidene (isopropylidene) succinic anhydride.

Another class of suitable photochromic materials are stilbenes of general formulas (the cis form may be colorless/weakly colored; the trans form may be differently colored):

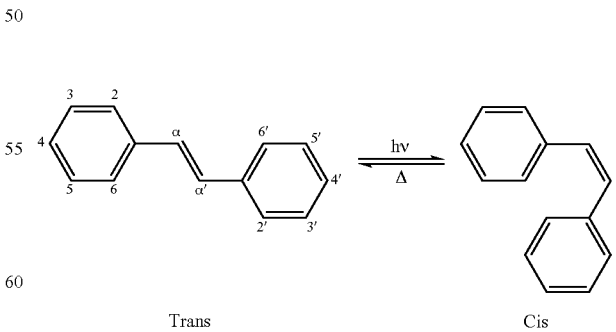

wherein one, two, three or more substituents may be optionally present at the 2, 3, 4, 5, 6, 2', 3', 4', 5', and 6' positions.

Specific examples of stilbenes include stilbene (no substituents), 3-methylstilbene, 4-methoxystilbene, 3-methoxystilbene, 4-aminostilbene, 4-fluorostilbene, 3-fluorostilbene, 4-chlorostilbene, 3-chlorostilbene, 4-bromostilbene, 3-bromostilbene, 3-iodostilbene, 4-cyanostilbene, 3-cyanostilbene, 4-acetylstilbene, 4-benzoylstilbene, 4-phenacylstilbene, 4-nitrostilbene, 3-nitrostilbene, 3-nitro-3'-methoxystilbene, 3-nitro-4-dimethylaminostilbene, 4,4'-dinitrostilbene, 4-nitro-4'-methoxystilbene, 4-nitro-3'-methoxystilbene, 4-nitro-4'-aminostilbene, 4-nitro-4'-dimethylaminostilbene, α-methylstilbene, α,α'-dimethylstilbene, α,α'-difluorostilbene, α,α'-dichlorostilbene, 2,4,6-trimethylstilbene, 2,2',4,4',6,6'-hexamethylstilbene, and the like.

Aromatic azo compounds that exhibit photochromism are of the general formulas (the cis form may be colorless/weakly colored; the trans form may be differently colored):

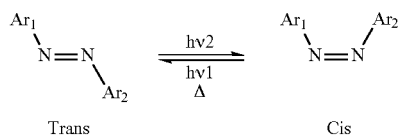

Trans           Cis wherein $Ar_1$ and $Ar_2$ are each, independently of the other, selected from the group consisting of aromatic groups. The aromatic groups can be substituted, with examples of substituents including alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, for example with from 1 to about 50 carbon atoms, such as from 1 to about 30 carbon atoms, aryl, for example with from about 6 to about 30 carbon atoms such as from about 6 to about 20 carbon atoms, arylalkyl, for example with from about 7 to about 50 carbon atoms such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms such as from 1 to about 30 carbon atoms, aryloxy groups, for example with from about 6 to about 30 carbon atoms such as from about 6 to about 20 carbon atoms, alkylthio groups, for example with from 1 to about 50 carbon atoms such as from 1 to about 30 carbon atoms, arylthio groups, for example with from about 6 to about 30 carbon atoms such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 20 carbon atoms such as from 1 to about 10 carbon atoms, aryloxy groups, for example with from about 6 to about 20 carbon atoms such as from about 6 to about 10 carbon atoms, alkylthio groups, for example with from 1 to about 20 carbon atoms such as from 1 to about 10 carbon atoms, arylthio groups, for example with from about 6 to about 20 carbon atoms such as from about 6 to about 10 carbon atoms, aldehyde groups, ketone groups, ester groups, amide groups, carboxylic acid groups, sulfonic acid groups, and the like. Further, two or more substituents can be joined together to form a ring.

Examples of photochromic aromatic azo compounds include azobenzene, 2-methoxyazobenzene, 2-hydroxyazobenzene, 3-methylazobenzene, 3-nitroazobenzene 3-methoxyazobenzene, 3-hydroxyazobenzene, 4-iodoazobenzene, 4-methylazobenzene, 4-carbomethoxyazobenzene, 4-acetylazobenzene, 4-carboxyazobenzene, 4-cyanoazobenzene, 4-ethoxyazobenzene, 4-methoxyazobenzene, 4-nitroazobenzene, 4-acetamidoazobenzene, 4-dimethylaminoazobenzene, 4-aminoazobenzene, 4-trimethylammonium azobenzene, 4-dimethylamino-4'-phenylazobenzene, 4-dimethylamino-4'-hydroxyazobenzene, 4,4'-bis-(dimethylamino)azobenzene, 4-dimethylamino-4'-p-aminophenylazobenzene, 4-dimethylamino-4'-p-acetamidophenylazobenzene, 4-dimethylamino-4'-p-aminobenzylazobenzene, 4-dimethylamino-4'-mercuric acetate azobenzene, 4-hydroxyazobenzene, 2-methyl-4-hydroxyazobenzene, 4-hydroxy-4'-methylazobenzene, 2,6-dimethyl-4-hydroxyazobenzene, 2,2',4',6,6'-pentamethyl-4-hydroxyazobenzene, 2,6-dimethyl-2',4',6'-trichloro-4-hydroxyazobenzene, 4-hydroxy-4'-chloroazobenzene, 2,2',4',6'-tetrachloro-4-hydroxyazobenzene, 3-sulfonate-4-hydroxyazobenzene, 2,2'-dimethoxyazobenzene, 3,3'-dinitroazobenzene, 3,3'-dimethylazobenzene, 4,4'-dimethylazobenzene, 4,4'-dimethoxyazobenzene, and the like.

Also suitable as the photochromic material are benzo and naphthopyrans (chromenes) of general formulas:

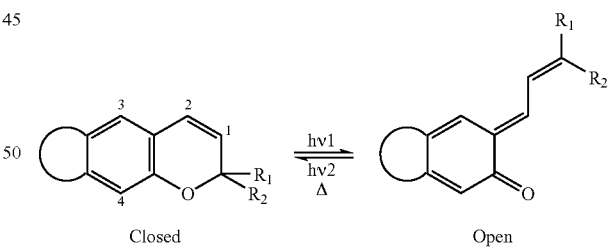

Closed           Open wherein one, two, three or more substituents may be optionally present at the 1, 2, 3 and 4 positions. Specific examples of chromenes include 3,3-diphenyl-3H-naphtho[2,1-b]pyran; 2-methyl-7,7-diphenyl-7H-pyrano-[2,3-g]-benzothiazole; and 2,2'-spiroadamantylidene-2H-naphtho-[1,2-b]pyran.

Bisimidazoles of the following general formulas are also suitable as the photochromic material (the form on the left may be colorless/weakly colored; the form on the right may be differently colored):

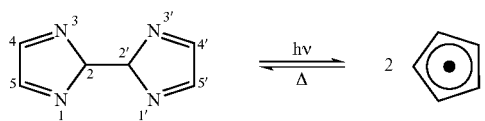

wherein one, two, three or more substituents may be optionally present at the 2, 4, 5, 2', 4', and 5' positions. Specific examples of photochromic bisimidazoles include 2,2',4,4',5,5'-hexaphenyl bisimidazole, 2,2',4,4',5,5'-hexa-p-tolyl bisimidazole, 2,2',4,4',5,5'-hexa-p-chlorophenyl bisimidazole, 2,2'-di-p-chlorophenyl-4,4',5,5'-tetraphenyl bisimidazole, 2,2'-di-p-anisyl-4,4',5,5'-tetraphenyl bisimidazole, and the like.

Spirodihydroindolizines and related systems such as tetrahydro- and hexahydroindolizine are also suitable photochromic materials. The general formulas of spirodihydroindolizines are shown below:

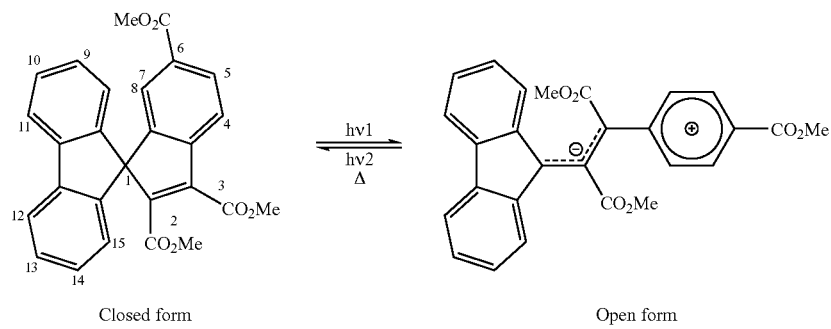

Closed form        Open form wherein one, two, three or more substituents may be optionally present at the 4, 5, 6, 7, 8, 9, 10, 11, 12 and 13 positions. Specific examples of photochromic spirodihydroindolizines include 4,5-dicarbomethoxy-3H-pyrazole-(3-spiro-9)-fluorene; 1'H-2',3'-6 tricarbomethoxy-spiro[fluorine-9-1'-pyrrolo[1,2-b]-pyridazine]; and 1'H-2',3'-dicyano-7-methoxy-carbonyl-spiro[fluorine-9,1'-pyrrolo-[1,2-b]pyridine].

Photochromic quinones of formulas (the form on the left may be colorless/weakly colored; the form on the right may be colored):

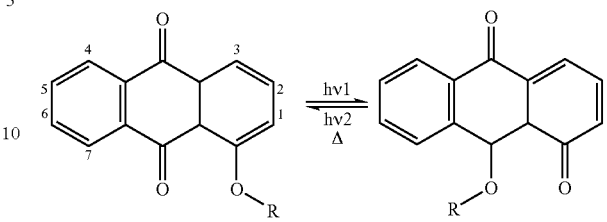

wherein one, two, three or more substituents may be optionally present at the 2, 4, 5, 6 and 7 positions, may also suitably be used. Specific examples of photochromic quinones include 1-phenoxy-2,4-dioxyanthraquinone; 6-phenoxy-5,12-naphthacenequinone; 6-phenoxy-5,12-pentacenequinone; and 1,3-dichloro-6-phenoxy-7,12-phthaloylpyrene.

Perimidinespirocyclohexadienones of the following formulas are also suitable as the photochromic material:

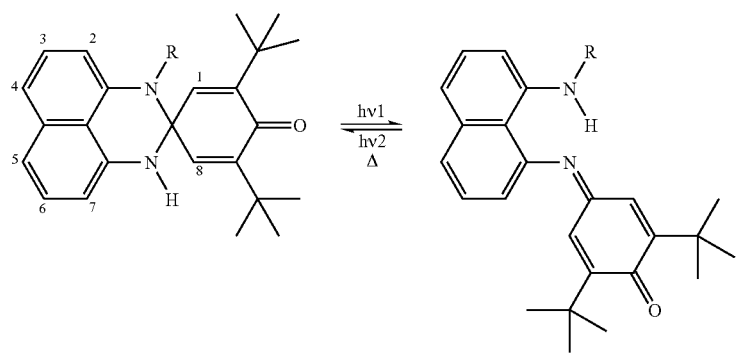

wherein one, two, three or more substituents may be optionally present at the 1, 2, 4, 5, 6, 7 and 8 positions. Specific examples of photochromic perimidinespirocyclohexadienones include 2,3-dihydro-2-spiro-4'-(2',6'-di-tert-butylcyclohexadien-2',5'-one)-perimidine; 1-methyl-2,3-dihydro-2-spiro-4'-(2',6'-di-tert-butylcyclohexadien-2',5'-one)-perimidine; 2,3-dihydro-2-spiro-4'-[(4H)-2'-tert-butylnaphthalen-1'-one]perimidine; and 5,7,9-trimethyl-2,3-dihydro-2-spiro-4'-(2', 6'-di-tert-butylcyclohexadien-2',5'-one)-pyrido-[4,3,2,d,e]quinazoline.

Photochromic viologens of the following formulas:

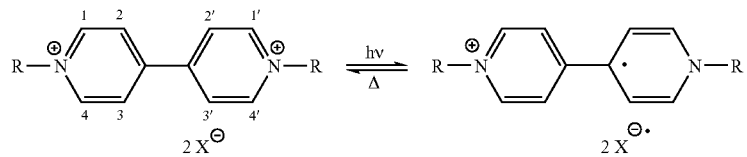

wherein one, two, three or more substituents may be optionally present at the 1, 2, 3, 4, 5, 6, 7 and 8 positions, may also be used. The X moiety may be any anion that acts as a counterion and is needed to compensate the positive charge of the bipyridinium cation. The X moiety may be, for example, a halogen anion like fluoride, chloride, bromide and iodide ions, tosylate, triflate and other anions. Specific examples of photochromic viologens include N,N'-dimethyl-4,4'-bipyridinium dichloride; N,N'-diethyl-4,4'-bipyridinium dibromide; N-phenyl, N'-methyl-4,4,-bipyridinium dichloride and the like.

Triarylmethanes of the following formulas are suitable as the photochromic material:

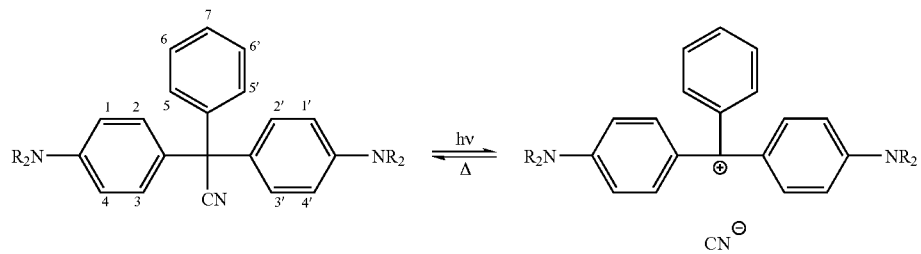

wherein one, two, three or more substituents may be optionally present at the 1, 2, 3, 4, 5, 6, 7, 1', 2', 3, 4', 5' and 6' positions.

Anils and related compounds of the following formulas are suitable as the photochromic material (the form on the left may be colorless/weakly colored; the form on the right may be differently colored):

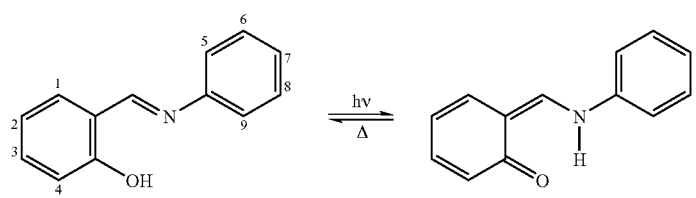

wherein one, two, three or more substituents may be optionally present at the 1, 2, 3, 4, 5, 6, 7, 8 and 9.

Mixtures of any of the foregoing photochromic materials may also be used.

In an alternative embodiment, a photochromic material that exhibits photochromism at wavelengths of radiation different from the wavelengths of UV radiation used to cure the ink may also be used. While fatigue resistance is less significant in this embodiment because the photochromic material is not subjected to strong energy effecting the photochromic shift in color during UV curing of the ink, fatigue resistance is still desirable in order to derive a printed image that may be subjected to a color change a useful number of times.

The ink composition may optionally contain a colorant, although a colorless ink is used to form hidden authenticating information in a printed document. Any desired or effective colorant can be employed in the inks, including dyes, pigments, mixtures of dyes, mixtures of pigments, mixtures of pigments and dyes, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, for example, Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Examples of suitable pigments include, for example, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™. (Cabot), Carbon Black 5250, Carbon Black 5750 (Columbia Chemical), mixtures thereof and the like.

The colorant may be included in the ink in an amount of from, for example, 0 to about 15% by weight of the ink, such as about 0.1 to about 10% by weight or from about 0.5 to about 8% by weight of the ink.

The ink also includes an initiator, for example a photoinitiator, that absorbs radiation, for example UV light radiation, to initiate curing of the curable components of the ink. As the initiator for radically curable inks, for example the acrylate group-containing or polyamide containing inks discussed above, photoinitiators such as benzophenones, benzoin ethers, benzilketals, α-hydroxyalkylphenones, α-aminoalkylphenones and acylphosphine photoinitiators sold under the trade designations of IRGACURE and DAROCUR from Ciba may be used. Specific examples include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); titanocenes; isopropylthioxanthone; 1-hydroxy-cyclohexylphenylketone; benzophenone; 2,4,6-trimethylbenzophenone; 4-methylbenzophenone; 2,4,6-trimethylbenzoylphenylphosphinic acid ethyl ester; oligo(2-hydroxy-2-methyl-1-(4-(1-methylvinyl)phenyl) propanone); 2-hydroxy-2-methyl-1-phenyl-1-propanone; benzyl-dimethylketal; and mixtures thereof. Amine synergists, for example such as ethyl-4-dimethylaminobenzoate and 2-ethylhexyl-4-dimethylaminobenzoate, may also be used. These photoinitiators typically absorb radiation at wavelengths ranging from about 200 to about 420 nm, although titanocenes may absorb at wavelengths of up to about 560 nm. The lower limit is typically determined by the transmittance of quartz, as most UV sources are quartz bulbs. Any known photoinitiator that initiates the free radical reaction upon exposure to a desired wavelength of radiation such as UV light can be used.

As the initiator for cationically curable inks, photoinitiators such as sulfonium, sulfoxonium, and iodonium salts (for example, arylsulfonium hexafluorophosphate salt, commercially available as UVI-6992 from Dow), and sensitized acids such as 5,7-diiodo-3-butoxy-6-fluorene (commercially available as H-Nu 470, H-Nu 535 and H-Nu 635 from Spectra Group Ltd.) combined with diaryl iodonium hexafluoroantimonate (available as SR 1012 from Sartomer Company, Inc.) may be used. These photoinitiators typically absorb radiation at wavelengths ranging from about 200 to about 340 nm, although titanocenes may absorb at wavelengths of up to about 560 nm.

In embodiments where the ink is intended to be colorless, it is desirable to use a photoinitiator system that is also substantially colorless. That is, the photoinitiator should also substantially exhibit no visible color, specifically yellow. Examples of suitable substantially colorless photoinitiarors include 1-hydroxy-cyclohexyl-phenyl-ketone (available as Ciba IRGACURE 184), mixtures of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester (available as Ciba IRGACURE 754), a mixture of 25% bis(2,6-dimethoxybenzoyl)-2,4,4-trimethyl-pentylphosphineoxide and 75% 1-hydroxy-cyclohexyl-phenyl-ketone (available as Ciba IRGACURE 1800), 1-[4-(2-hydroxyethoxy)-phenyl]-2-hydroxy-2-methyl-1-propane-1-one (available as Ciba IRGACURE 2959) and 2-hydroxy-2-methyl-1-phenyl-propan-1-one (available as Ciba DAROCUR 1173).

The total amount of initiator included in the ink may be from, for example, about 0.5 to about 15%, such as from about 0.5 to about 12% or from about 1 to about 10%, by weight of the ink.

The inks may also optionally include 0 to about 50% by weight, for example from about 5 to about 50% or from about 10 to about 35% by weight, of the ink of a low molecular weight wax or thermal solvent. These materials may be included to increase the viscosity of the ink at room temperature, often rendering the ink solid or semi-solid. Upon heating to the jetting temperature, these solid materials at room temperature can function as compatibilizer solvents for the ink components, hence the name thermal solvents. Example waxes to include in the ink may be, for example, paraffins, microcrystalline waxes, polyethylene waxes, ester waxes, amide waxes, fatty acids, fatty alcohols, fatty amides and other waxy materials. Example thermal solvents to include in the ink may be, for example, low molecular weight polyols, sulfonamide materials (for example, methyl sulfonamide), urea, ethyl urea, ethylene carbonate, tetrahydro-thiophene-1,1-dioxide, methyl anisate, bifunctional fatty alcohols such 1,10 decanediol or 1,12 dodecanediol, pyridine N-oxide (mp 61-65° C.), acetamide (mp 79-81° C.), acrylamide (mp 84-86° C.), sulfamide (mp 91-92° C.), maleimide (mp 92-94° C.), pyrazole (mp 67-70° C.), and imidazole (mp 90-91° C.).

In embodiments, a bifunctional fatty alcohol may be included as a thermal solvent in an amount of from about 5 to about 50%, such as from about 10 to about 40% or from about 25 to about 35%, by weight of the ink. In such embodiments, the use of cationic curing over free radical curing may be advantageous since the fatty alcohols can react during the cationic cure so as to become part of the cured network.

The inks can also optionally contain an antioxidant. The optional antioxidants of the ink compositions protect the images from oxidation and also protect the ink components from oxidation during the heating portion of the ink preparation process. Specific examples of suitable antioxidants include, for example, NAUGARD™ 524, NAUGARD™ 635, NAUGARD™ A, NAUGARD™I-403, and NAUGARD™ 959, commercially available from Crompton Corporation, Middlebury, Conn., IRGANOX™ 1010, IRGASTAB UV 10 commercially available from Ciba Specialty Chemicals, and the like. When present, the optional antioxidant is present in the ink in any desired or effective amount, for example in an amount of from about 0.01 to about 20% percent by weight of the ink, such as from about 0.1 to about 5% or from about 1 to about 3%, by weight of the ink.

The inks may also optionally contain non-reactive agents that help control the extent of reactivity of the network formed from the curable gelators. The non-reactive reactivity control agent may comprise a non-reactive model of the reactive gelator compound. The non-reactive organogelator may have a low molecular mass, and may be, for example, an N-acyl-1,ω-amino acid derivative. An example of such reactivity-control agent is

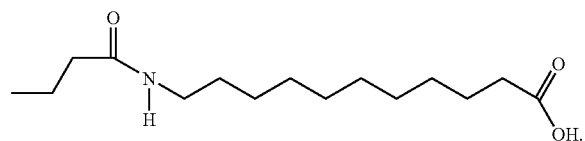

Other optional additives to the inks include plasticizers, such as UNIPLEX™ 250 (commercially available from Uniplex), the phthalate ester plasticizers commercially available from Monsanto under the trade name SANTICIZER™, such as dioctyl phthalate, diundecyl phthalate, alkylbenzyl phthalate (SANTICIZER™ 278), triphenyl phosphate (commercially available from Monsanto), KP-140™, a tributoxyethyl phosphate (commercially available from FMC Corporation), MORFLEX™ 150, a dicyclohexyl phthalate (commercially available from Morflex Chemical Company Inc.), trioctyl trimellitate (commercially available from Eastman Kodak Co.), and the like, may be added in an amount of about 0.1 to about 25% by weight of the ink, for example from about 1 to about 20% or from about 1 to about 10% by weight of the ink.

The inks of embodiments may further include conventional type additives to take advantage of the known functionality associated with such conventional additives. Such additives may include, for example, defoamers, slip and leveling agents, pigment dispersants, etc.

The inks may be prepared by any suitable technique. As an example, the inks may be prepared by first dissolving any non-reactive components of the ink into a selected molten vehicle, for example composed of compatible low molecular waxes and/or thermal solvents, then while heating at appropriate temperature, adding the specified amount of curable gelator, and thereafter adding the photochromic material and any colorant while agitating the mixture. Finally, the required amount of initiator(s) may be added. The ink may then be filtered, form example at an elevated temperature, through a filter or series of filters, the final filtration being done through a 1.0 micron filter to remove larger particulates. The method of preparation for the inks may be modified so as to accommodate the type of reactive gelling agents used for the preparation of the inks. For example, a concentrate of the gelling agent may be prepared in one of the components of the ink prior to the addition of the other components. Further examples of ink preparation methods are set forth in the Examples below.

In embodiments, the ink is made by adding the photochromic material to a colorless UV curable base ink. The ink may be then be used to form an image, for example via ink jetting, on an image receiving substrate, for example paper, cardboard, fabric, transparency and the like. After printing onto the image receiving substrate, the image is cured via exposure to UV light to fix it to the substrate. Immediately after this UV curing, the photochromic material is visible, that is, it is in the colored state, when the photochromic material is sensitive to the UV light used in curing. The image may be made to fade quickly via exposure to strong visible light, for example having wavelengths greater than 450 nm, or may be made to fade more slowly under exposure to visible room light.

As a result, the inks herein provide the ability to print documents with UV curable inks with the added capability of displaying reimageable information. This permits the ink to be used for authentication purposes, since a forged documents would lack the ability of making the information printed with the photochromic ink in the authentic document appear and disappear. Thus, a photocopy of an authentic document would lack the transient information included in the authentic document via the photochromic ink, and could readily be determined to be a non-authentic document through exposure to activating radiation, which would expose the fact that the information verifying authenticity is missing. The photochromic ink thus enables authenticating information to be included in a document.

The inks described herein may be jetted at temperatures of about 50° C. to about 130° C., for example from about 60° C. to about 110° C. or from about 60° C. to about 100° C. At jetting, the inks may have a viscosity of from about 1 to about 20 cps, for example from about 5 to about 15 cps or from about 8 to about 12 cps.

The inks can be employed in an apparatus for direct printing ink jet processes, for example a thermal ink jet device, an acoustic ink jet device or a piezoelectric ink jet device, and jetting or ejecting droplets of the ink in an imagewise pattern directly onto an image receiving substrate. In this embodiment, the ink is heated to a first temperature, which is above any gel point and melting point of the ink, and printed directly onto an image receiving substrate. The image receiving substrate may be kept at a temperature at which the ink forms a gel state, for example at or slightly above room temperature. For example, the substrate may be maintained at a temperature of about 30° C. to about 60° C., for example from about 30° C. to about 50° C. or from about 30° C. to about 40° C. In this way, where the ink contains a gelator, the jetted ink may be made to rapidly form a gel, which gel may be maintained on the surface of the substrate until curing. The ink on the substrate is then exposed to radiation energy to initiate polymerization of the polymerizable components of the ink.

The inks can also be employed in indirect (offset) printing ink jet applications, wherein when droplets of the melted ink are ejected in an imagewise pattern onto a recording substrate, the recording substrate is an intermediate transfer member such as an intermediate transfuse drum or belt and the ink in the imagewise pattern is subsequently transferred from the intermediate transfer member to a final recording substrate. In a suitable design, the ink is jetted onto the intermediate transfer member where a gel state forms, and then the image is transferred to the final image receiving substrate where the ink is cured.

When the ink is on the image receiving substrate, the ink is then cured by exposing the image on the substrate to radiation having an appropriate wavelength, mainly the wavelength at which the ink initiator absorbs radiation. This initiates the curing reaction of the ink. The radiation exposure need not be long, and may be for example from about 0.05 to about 10 seconds, or from about 0.2 to about 2 seconds. These exposure times are more often expressed as substrate speeds of the ink passing under a UV lamp. For example, a microwave energized, doped mercury bulbs available from UV Fusion (Gaithersburg, Md.) are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 s to pass under four bulb assemblies. The radiation to cure the polymerizable components of the ink may be provided by a variety of possible techniques, including for example a xenon lamp, laser light, D or H bulb, etc. The curing light may be filtered, if desired or necessary. The curable components of the ink react to form a cured or crosslinked network of appropriate hardness. The curing may be substantially complete to complete, for example at least 75% of the curable components are cured (reacted and/or crosslinked). This allows the ink to be substantially hardened, and thereby to be much more scratch resistant, and also adequately controls the amount of showthrough on the substrate.

The inks may also undergo an optional heating procedure to treat the ink in an effort to further advance the curing of the ink. This procedure may advantageously be used with cationically cured inks.

The following example inks were prepared to further illustrate embodiments described herein.

EXAMPLE 1

A UV curable ink composition was prepared by adding 2.5 g of gelator, 2 g of IRGACURE 2022 photoinitiator (20% phosphine oxide, phenyl bis(2,4,6-trimethyl benzoyl)/80% 2-hydroxy-2-methyl-1-phenyl-1-propanone) and 1 g of iso-propyl-9H-thioxanthen-9-one (DAROCUR ITX, obtained from Ciba Specialty Chemicals) photoinitiator to 44.5 g of SR 9003 monomer, and the mixture was stirred at 80° C. until the gellant and photoinitiators were dissolved. 0.1 g of the photochromic material

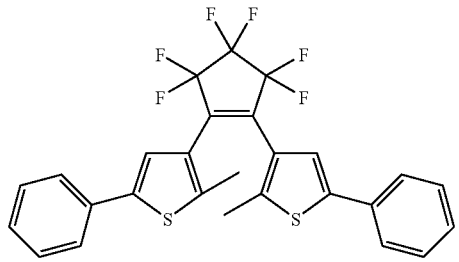

was added to 5 g of the above ink mixture and heated at 80° C. with stirring to ensure dissolution of the photochromic compound. The gelator used in this example is believed to be a mixture of the following compounds:

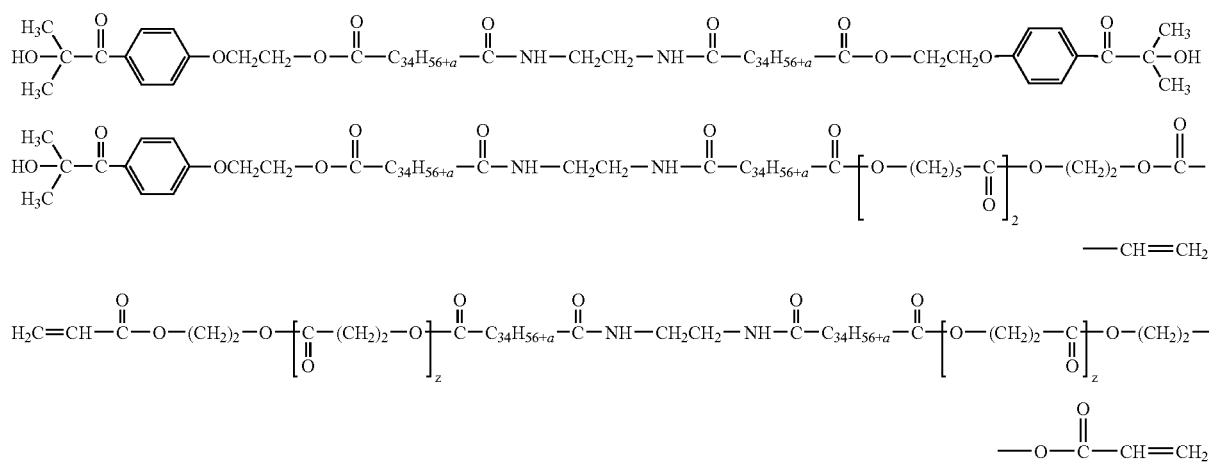

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11 or 12.

EXAMPLE 2

A sheet of XEROX 4024 paper was coated with a blade with the composition of Example 1, while hot. The sample was photocured using a UV Fusion LC-6B Benchtop Conveyor equipped with UV Fusion F300S Ultraviolet Lamp. After curing, the ink solidified and the paper was blue. The paper was then exposed to visible light having a wavelength greater than 450 nm using a Xenon lamp and a light filter, and the color rapidly disappeared.

EXAMPLE 3

A UV curable ink composition was prepared by adding 0.4 g of IRGACURE 2022 photoinitiator and 0.2 g of DAROCUR ITX photoinitiator to 9.2 g of SR 9003 monomer, and the mixture was stirred at 80° C. until the photoinitiators were dissolved. 0.1 g of the photochromic material

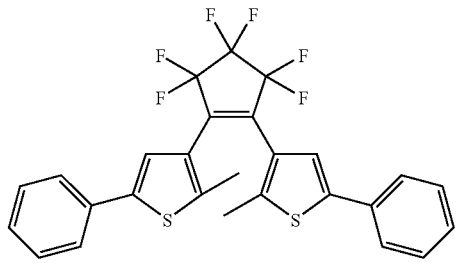

was added to 5 g of the above ink mixture and heated at 50° C. with stirring to ensure dissolution of the photochromic compound.

The ink was then placed in pen for writing onto paper. After writing on the paper and curing the ink with UV light, the written image appeared in blue. Exposure to strong visible light made the written image disappear rapidly. The image was the re-exposed to UV light, and again appeared in blue. The image was allowed to sit in room light, and the image disappeared in about 20 hours. The coloration/decoloration cycle was repeated about 5 times, and no degradation of the ink, coloration or cycle times was observed.

While the inks have been described in conjunction with specific embodiments described above, it is evident that many alternatives, modifications and variations will be apparent to those skilled in the art. Accordingly, the embodiments, as set forth above, are intended to be illustrative and not limiting. Various changes may be made without departing from the spirit and scope of the inks described herein.

What is claimed is:

1. A photochromic ink comprising an ink vehicle that includes at least one radiation curable component, at least one photochromic material, at least one epoxy-containing or amine-containing gelator, and at least one photoinitiator.

2. The photochromic ink according to claim 1, wherein the at least one photochromic material has a fatigue resistance such that following curing of the photochromic ink by exposure to curing radiation, the photochromic material is able to change from a colored state to a substantially non-colored state for at least about 10 times.

3. The photochromic ink according to claim 1, wherein the at least one photochromic material is selected from the group consisting of diarylethenes, spiropyrans, spirooxazines, fulgides, stilbenes, aromatic azo compounds, benzopyrans, naphthopyrans, bisimidazoles, spirodihydroindolizines, spirotetrahydroindolizines, spirohexahydroindolizines, quinones, perimidinespirocyclohexadienones, viologens, triarylmethanes, anils, and mixtures thereof.

4. The photochromic ink according to claim 1, wherein the at least one photochromic material includes a diarylethene of the formula

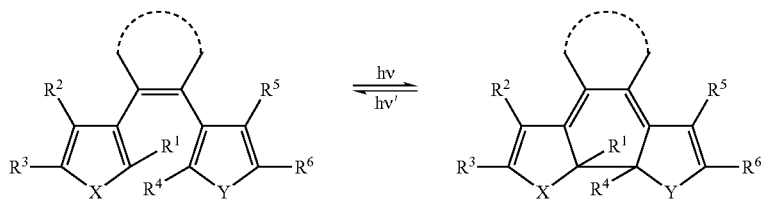

wherein X and Y are, each independently, sulfur, nitrogen, hydrogen, or oxygen, $R^1$ and $R^4$ are, independently, an alkyl, alkoxy or aryl group having from 1 to about 30 carbon atoms, $R^2, R^3, R^5$, and $R^6$ are independently hydrogen, alkyl having from 1 to about 50 carbon atoms, aryl having from about 5 to about 30 carbon atoms, arylalkyl having from about 6 to about 50 carbon atoms, silyl groups, nitro groups, sulfo groups, cyano groups, halide atoms, amine groups, hydroxy groups, alkoxy groups having from 1 to about 50 carbon atoms, aryloxy groups having from about 5 to about 30 carbon atoms, alkylthio groups or alkylsulfo groups having from 1 to about 50 carbon atoms, arylthio groups or arylsulfo groups having from about 5 to about 30 carbon atoms, aldehyde groups, ketone groups, ester groups, amide groups, carboxylic acid groups, or sulfonic acid groups, or two or more R groups can be joined together to form a ring.

5. The photochromic ink according to claim 1, wherein the at least one photochromic material includes a diarylethene selected from the group consisting of

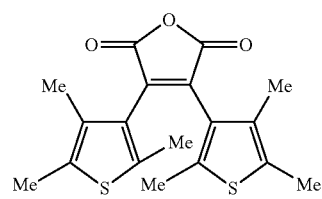

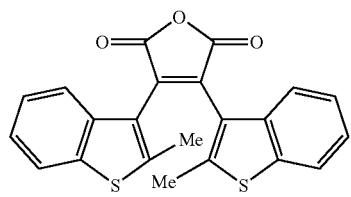
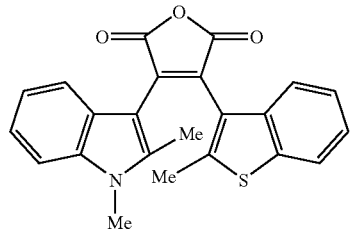
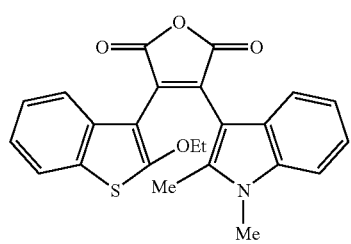
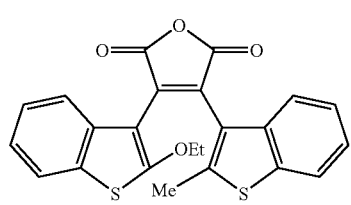
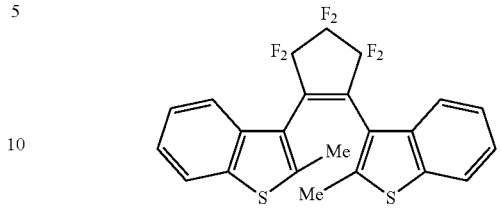
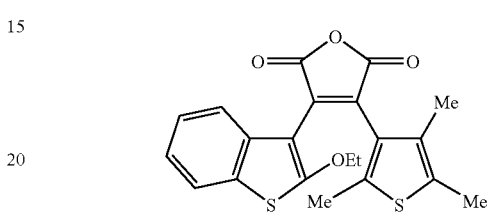
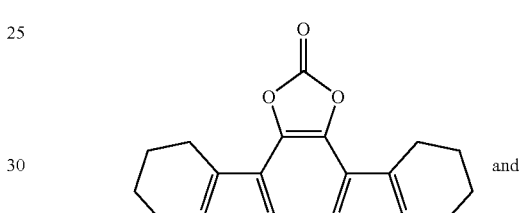
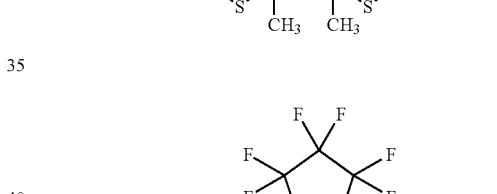
and
6. The photochromic ink according to claim 1, wherein the at least one photochromic material includes a spirooxazine of the formula
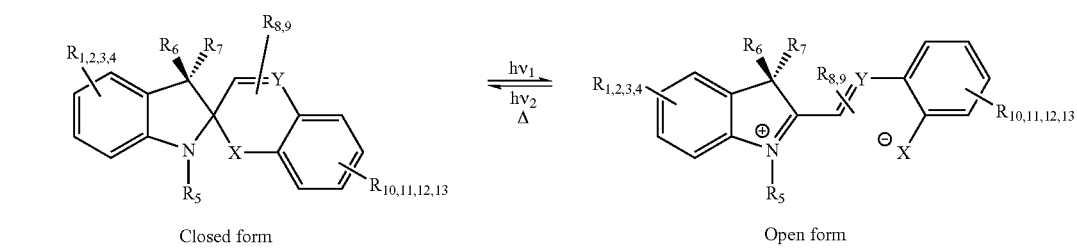

wherein $R_1$, $R_2$, $R_3$, $R_4$, $R_5$, $R_6$, $R_7$, $R_8$, $R_9$, $R_{10}$, $R_{11}$, $R_{12}$ and $R_{13}$ each, independently of the others, is hydrogen, alkyl having from 1 to about 50 carbon atoms, aryl having from about 5 to about 30 carbon atoms, arylalkyl having from about 6 to about 50 carbon atoms, silyl groups, nitro groups, sulfo groups, cyano groups, halide atoms, amine groups, hydroxy groups, alkoxy groups having from 1 to about 50 carbon atoms, aryloxy groups having from about 5 to about 30 carbon atoms, alkylthio groups or alkylsulfo groups having from 1 to about 50 carbon atoms, arylthio groups or arylsulfo groups having from about 5 to about 30 carbon atoms, aldehyde groups, ketone groups, ester groups, amide groups, carboxylic acid groups, or sulfonic acid groups, or two or more R groups can be joined together to form a ring, X is O and Y is N.

7. The photochromic ink according to claim 1, wherein the at least one photochromic material includes a spirooxazine selected from the group consisting of 1,3-dihydro-1,3,3-trimethylspiro[2H-indole-2,3'-[3H]naphth[2,1-b]-[1,4]oxazine], 1,3-dihydro-1,3,3-trimethyl-5-nitrospiro[2H-indole-2,3'-[3H]naphth[2,1-b]-[1,4]oxazine], 1,3-dihydro-1,3,3-trimethyl-5,6'-dinitro-spiro[2H-indole-2,3'-[3H]naphth[2,1-b]-[1,4]oxazine], 1,3-dihydro -1,3,3-trimethyl-5-methoxy,5'-methoxy-spiro[2H-indole-2,3'-[3H]naphth[2,1-b]-[1,4]oxazine], and 1,3-dihydro-1-ethyl-3,3-dimethyl-5'-nitrospiro[2H-indole-2,3'-[3H]naphth[2,1-b]-[1,4]oxazine].

8. The photochromic ink according to claim 1, wherein the at least one photochromic material includes a fulgide of the formula:

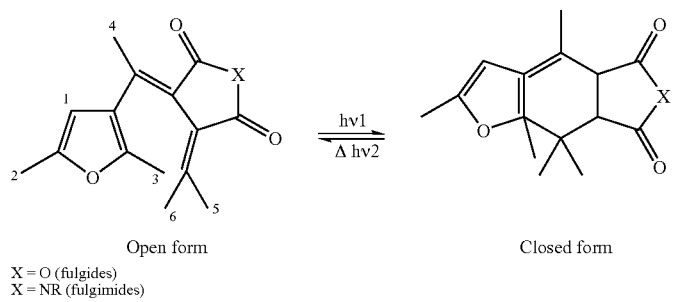

Open form                Closed form

X = O (fulgides)
X = NR (fulgimides)

wherein one, two, three or more substituents may be optionally present at the 1, 2, 4, 5 and 6 positions, wherein X is O or NR, and wherein R is hydrogen, alkyl having from 1 to about 50 carbon atoms, aryl having from about 5 to about 30 carbon atoms, arylalkyl having from about 6 to about 50 carbon atoms, silyl groups, nitro groups, sulfo groups, cyano groups, halide atoms, amine groups, hydroxy groups, alkoxy groups having from 1 to about 50 carbon atoms, aryloxy groups having from about 5 to about 30 carbon atoms, alkylthio groups or alkylsulfo groups having from 1 to about 50 carbon atoms, arylthio groups or arylsulfo groups having from about 5 to about 30 carbon atoms, aldehyde groups, ketone groups, ester groups, amide groups, carboxylic acid groups, or sulfonic acid groups.

9. The photochromic ink according to claim 1, wherein the at least one photochromic material includes a fulgide selected from the group consisting of 1-(p-methoxyphenyl)-ethylidene (isopropylidene) succinic anhydride, 2-[1-(2,5-dimethyl-3-furyl)-2-methylpropylidene]-3-isopropylidene succinic anhydride, and (1,2-dimethyl-4-isopropyl-5-phenyl)-3-pyrryl ethylidene (isopropylidene) succinic anhydride.

10. The photochromic ink according to claim 1, wherein the photochromic material comprises from about 1% to about 10% by weight of the photochromic ink.

11. The photochromic ink according to claim 1, wherein the at least one radiation curable component is a cycloaliphatic epoxide, a multifunctional vinyl ether, an acrylate or methacrylate monomer or oligomer, or includes the following:

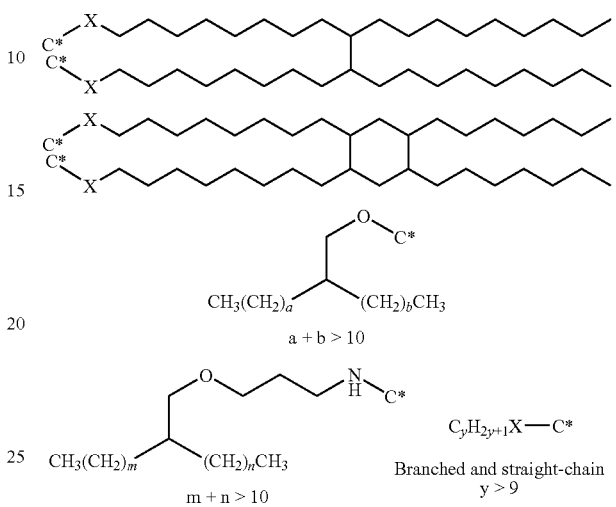

-continued

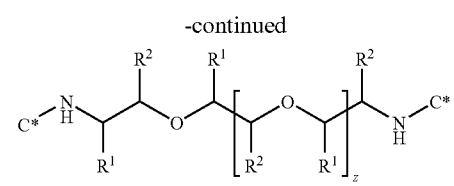

When $R^1 = CH_3$, $R^2 = H$; when $R^1 = H$, $R^2 = CH_3$
isomeric mixture of propyloky (PO) units where X is O or NH, and C* is any of

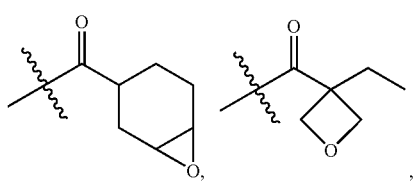

-continued

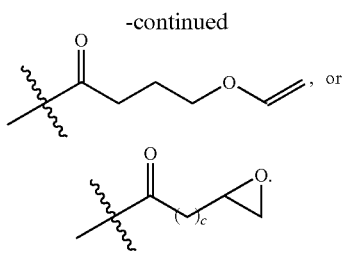

12. The photochromic ink according to claim 1, wherein the radiation curable component comprises from about 5% to about 95% by weight of the photochromic ink.

13. The photochromic ink according to claim 1, wherein the ink forms a gel state having a viscosity of at least $10^{2.5}$ cps at temperatures between about 30° C. to about 60° C.

14. The photochromic ink according to claim 1, wherein the ink has a viscosity of about 1 to about 20 cps at temperatures of from about 50° C. to about 150° C.

15. The photochromic ink according to claim 1, wherein the gelator comprises from about 1% to about 50% by weight of the ink.

16. The photochromic ink according to claim 1, wherein the at least one photoinitiator comprises from about 0.5% to about 15% by weight of the ink.

17. The photochromic ink according to claim 1, wherein the ink further comprises at least one colorant.

18. The photochromic ink according to claim 1, wherein the ink further comprises at least one thermal solvent selected from among polyols, sulfonamides, urea, ethyl urea, ethylene carbonate, tetrahydro-thiophene-1,1-dioxide, methyl anisate, bifunctional fatty alcohols, pyridine N-oxide, acetamide, acrylamide, sulfamide, maleimide, pyrazole or imidazole.

19. The photochromic ink according to claim 1, wherein the at least one photoinitiator is selected from the group consisting of benzophenones, benzoin ethers, benzilketals, α-hydroxyalkylphenones, α-aminoalkylphenones, acylphosphines, titanocenes, isopropylthioxanthone, 1-hydroxy-cyclohexylphenylketone, benzophenone, 2,4,6-trimethylbenzophenone, 4-methylbenzophenone, 2,4,6-trimethylbenzoylphenylphosphinic acid ethyl ester, oligo(2-hydroxy-2-methy-1-(4-(1-methylvinyl)phenyl) propanone), 2-hydroxy-2-methyl-1-phenyl-1-propanone, benzyl-dimethylketal, ethyl-4-dimethylaminobenzoate, 2-ethylhexyl1-4-dimethylaminobenzoate, sulfonium salts, sulfoxonium salts, iodonium salts, sensitized acids and mixtures thereof.

20. An image forming process, comprising
providing a photochromic ink comprising an ink vehicle that includes at least one radiation curable component, at least one photochromic material, at least one epoxy-containing or amine-containing gelator, and at least one photoinitiator,
forming an image on an image receiving substrate with the photochromic ink, and
curing the photochromic ink by exposure to radiation for curing the at least one radiation curable component.

21. The image forming process according to claim 20, wherein the image is formed by jetting the photochromic ink at a temperature of from about 50° C. to about 130° C. onto the image receiving substrate.

22. The image forming process according to claim 20, wherein the process further comprises permitting the ink to form a gel state during formation of the image on the image receiving substrate.

23. A process for authenticating a document, comprising forming an image on the document with a photochromic ink comprising an ink vehicle that includes at least one radiation curable component, at least one photochromic material, at least one epoxy-containing or amine-containing gelator, and at least one photoinitiator,
curing the photochromic ink by exposure to radiation for curing the at least one radiation curable component, which curing effects a color change in the at least one photochromic material, and subsequently exposing the cured ink to visible light to render the photochromic material substantially colorless, and
exposing the document to activating radiation to generate a color change in the photochromic ink, the color change indicating the authenticity of the document.

24. A process according to claim 23, wherein the wavelength of the activating radiation is from about 200 to about 400 nm.

* * * * *